United States Patent [19]
Li

[11] Patent Number: 5,161,824
[45] Date of Patent: Nov. 10, 1992

[54] SAFETY BELT WITH PROTECTIVE PAD

[76] Inventor: Kwan-Tao Li, 9F, No. 19, Lane 464, Tun Hua South Road, Taipei, Taiwan

[21] Appl. No.: 810,509

[22] Filed: Dec. 19, 1991

[51] Int. Cl.$^5$ .............................................. B60R 22/00
[52] U.S. Cl. ................................... 280/808; 297/482; 280/801
[58] Field of Search ............... 280/801, 808; 297/482, 297/483, 484

[56] References Cited

U.S. PATENT DOCUMENTS

| | | | |
|---|---|---|---|
| 2,615,172 | 10/1952 | Donegan | 2/2 X |
| 4,619,468 | 10/1986 | Spill | 280/808 X |
| 4,678,205 | 7/1987 | Wold | 297/482 X |
| 4,693,495 | 9/1987 | LaPointe | 297/482 X |
| 4,699,401 | 10/1987 | Saenz | 280/808 |
| 4,741,574 | 5/1988 | Weightman | 280/801 X |
| 4,786,080 | 11/1988 | Jay | 280/808 |
| 4,795,190 | 1/1989 | Weightman et al. | 280/808 |
| 4,929,027 | 5/1990 | Beavias, II | 297/482 |
| 4,969,663 | 11/1990 | Nowacki | 280/808 |

FOREIGN PATENT DOCUMENTS

| | | | |
|---|---|---|---|
| 2448727 | 4/1976 | Fed. Rep. of Germany | 297/482 |
| 3019378 | 11/1981 | Fed. Rep. of Germany | 297/482 |
| 3501747 | 9/1986 | Fed. Rep. of Germany | 297/482 |
| 2633572 | 1/1990 | France | 280/801 |
| 34840 | 2/1987 | Japan | 297/482 |
| 50258 | 3/1987 | Japan | 297/482 |

Primary Examiner—Kenneth R. Rice
Attorney, Agent, or Firm—Lasas & Parry

[57] ABSTRACT

A safety belt with protective pad comprising a belt body which is fixed inside a vehicle and guided by a guide to extend over a user's shoulder and is retractable into a storing bank disposed in the vehicle, and a protective pad which is made of a soft material and is slidably attached on the belt so that when the safety belt is to be used, the pad is movable to substantially extend over the user's shoulder and chest to protect the user from chafe with the belt when the vehicle is violently jolted.

10 Claims, 5 Drawing Sheets

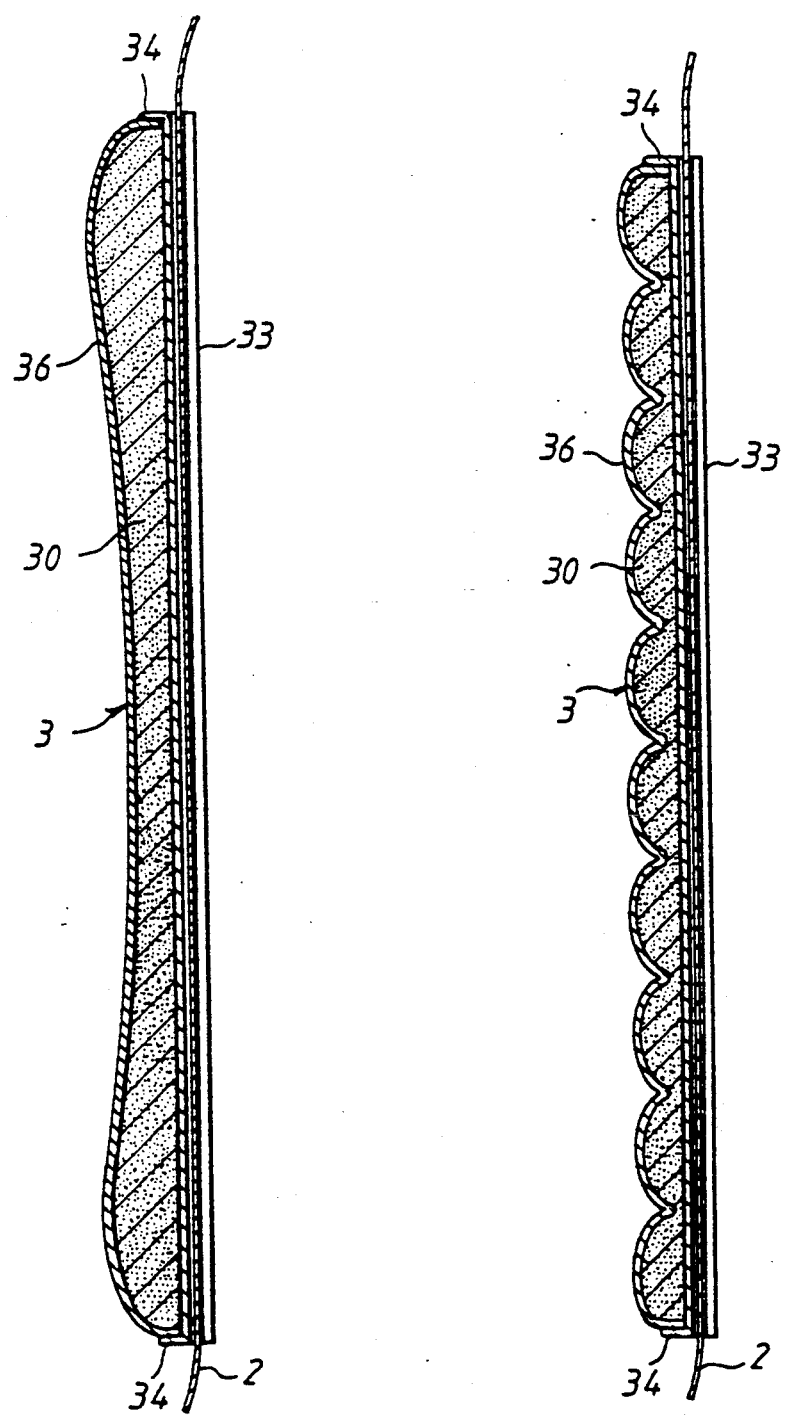

SAFETY BELT WITH PROTECTIVE PAD

FIELD OF THE INVENTION

The present invention relates generally to a passenger car safety belt and in particular to a safety belt having a soft protective pad which is slidably attached thereon to protect a user from chafe caused by the belt.

BACKGROUND OF THE INVENTION

Conventionally, a safety belt is for use in a highway passenger car to protect the users from being hurt in a traffic accident, and the conventional safety belt is designed for this purpose. It is evident that the conventional safety belt is good for such a purpose. However, since the conventional safety belt is designed for protecting the users from a major injury in a major accident, such as a collision of vehicles, an emergent stop of vehicles moving with high speeds and vehicles colliding, the design is emphasized on strengthening the belt and reducing the inconvenience of using the belt.

As noted previously, when a vehicle is being driven on a well-paved road or a highway, there is no major disadvantage of the conventional design of safety belts in protecting the users from major injuries in an accident. However, when a vehicle is driven off road, the jolt of the unpaved path or trail often result in a shake of the vehicle, especially when the vehicle is in a high speed situation. The safety belt rubs and chafes the users' shoulder and chest under the circumstances.

SUMMARY OF THE INVENTION

It is therefore an object of the present invention to provide a safety belt with a protective pad for off-road vehicles, such as a jeep or truck, to protect users from being hurt by the safety belt because of irregular jolts of the vehicle.

It is another object of the present invention to provide a safety belt having a slidable protective pad thereon to protect the passengers of a passenger car from chafe when the car is driven on a poorly-paved or unpaved road and thus violently shaking.

It is a further object of the present invention to provide a safety belt having a slidable protective pad for protecting the passengers of a car from chafe, especially the shoulder and the chest, in a traffic accident, such as a violent collision or emergent deceleration.

To achieve the above-mentioned objects, there is provided a safety belt with protective pad comprising a belt body which is fixed inside a vehicle and guided by a guide to extend over a user's shoulder and is retractable into a storing bank disposed in the vehicle, and a protective pad which is made of a soft material and is slidably attached on the belt so that when the safety belt is to be used, the pad is movable to substantially extend over the user's shoulder and chest to protect the user from chafe with the belt when the vehicle is violently jolted.

Other advantages, features and objects of the present invention will be readily appreciated as the same become more apparent with reference to the following detailed description when considered in conjunction with the accompanying drawings, wherein:

BRIEF DESCRIPTION OF THE DRAWINGS

FIG. 5 is a cross-sectional view of the safety belt in FIG. 1; and

FIG. 6 is a cross-sectional view of a second embodiment of the safety belt with protective pad in accordance with the present invention.

DETAILED DESCRIPTION OF THE PREFERRED EMBODIMENTS

Figure 1:
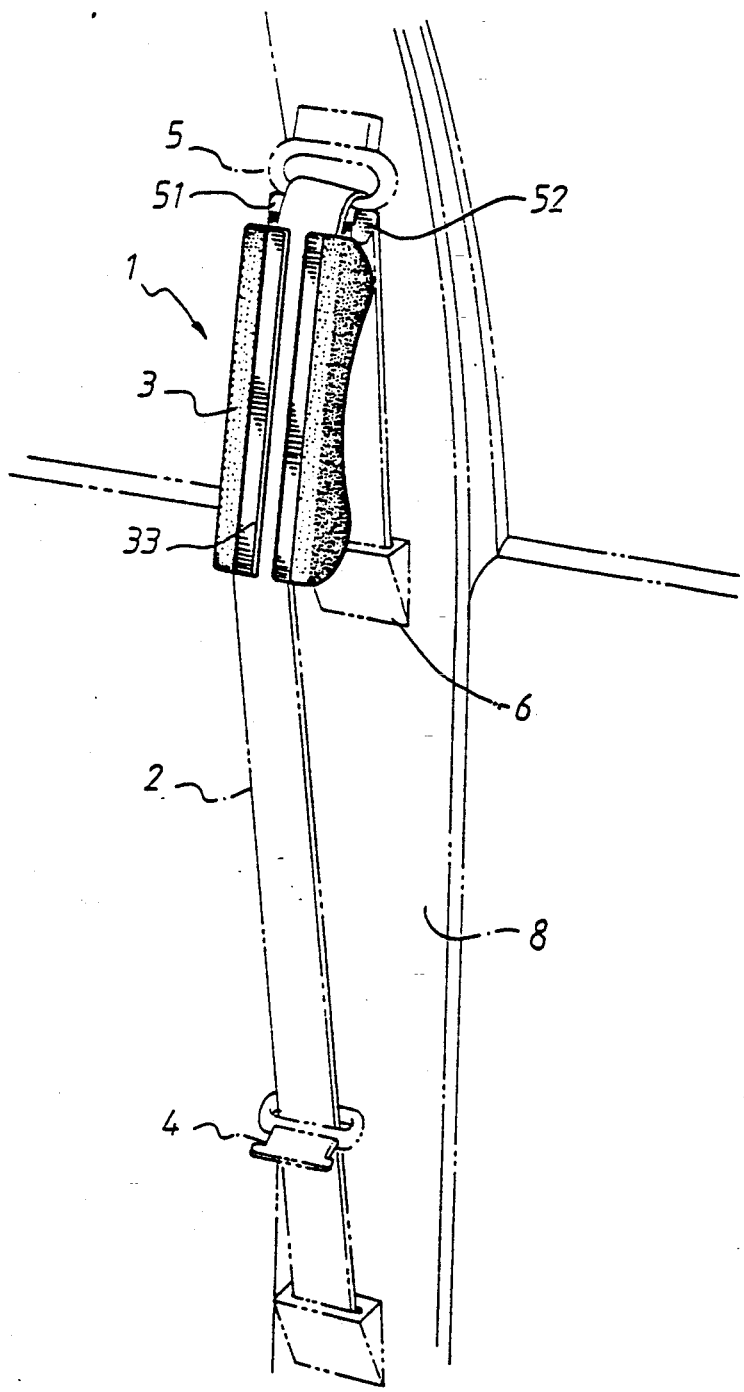
FIG. 1 is a perspective view of a first embodiment of the safety belt with protective pad in accordance with the present invention.
Figure 2:
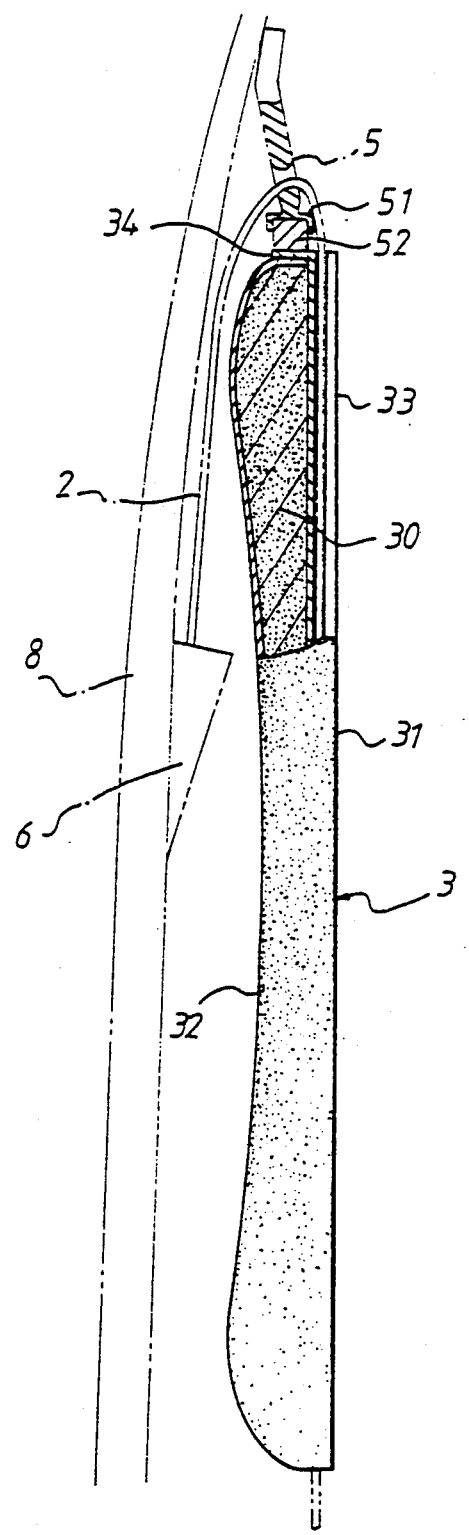
FIG. 2 is a partial cross-sectional view of the safety belt with protective pad shown in FIG. 1 to show the detailed structure of the protective pad.
Figure 3:
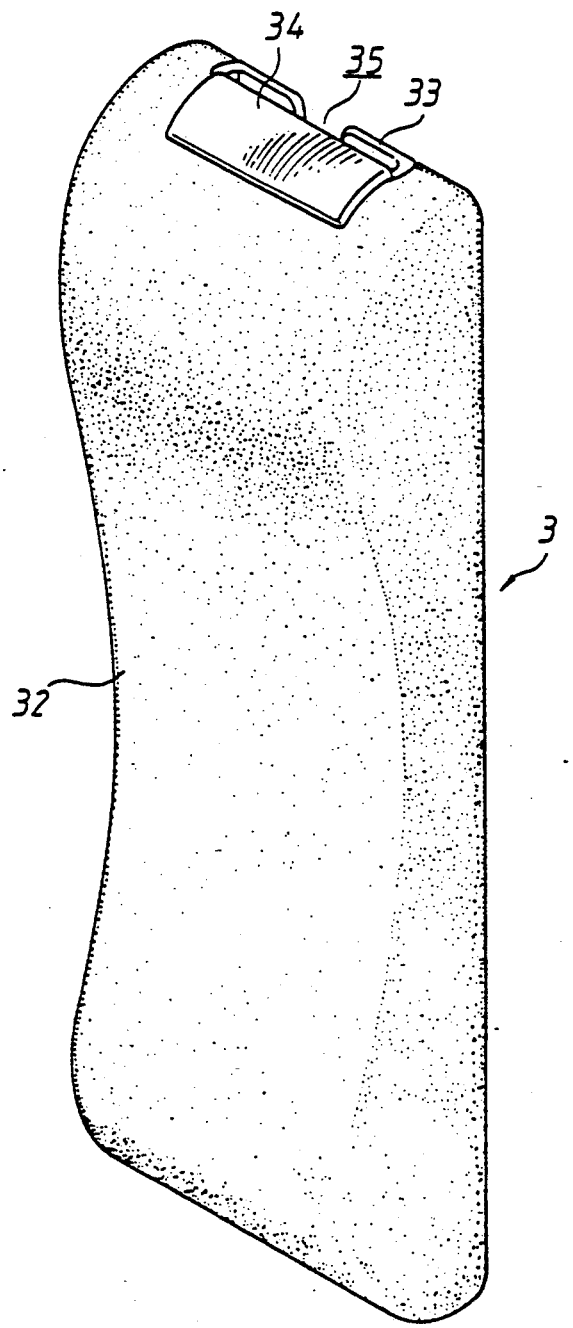
FIG. 3 is a perspective view of the protective pad used in the belt shown in FIG. 1.
Figure 4:
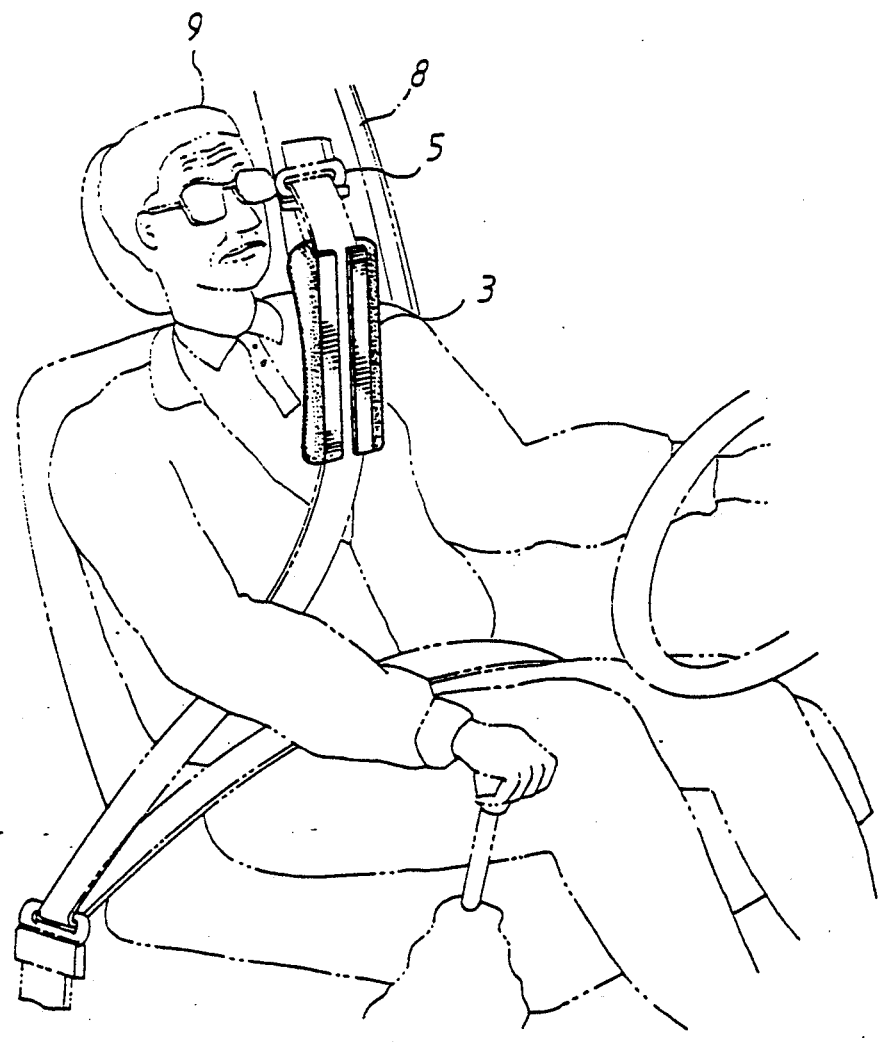
FIG. 4 is a perspective view showing a driver wearing the safety belt shown in FIG. 1.

With reference to the drawings, same reference numerals denote same elements, in particular in FIGS. 1 to 5, wherein the first embodiment of the present invention is shown. A safety belt with protective pad in accordance with the present invention, generally designated with reference numeral 1, comprises a belt body 2 on which a protective pad 3 is slidably attached. The installation of the belt body 2 inside a vehicle 8 is conventional and is well known to those skilled in the art. That is one end of the belt body 2 is fixed on the vehicle body 8 and the other end, passing through a guide 5 which is pivotally fixed on the vehicle body 8, is retractable into a storing bank 6 formed inside the vehicle 8. A buckle member 4 is slidably mounted on the belt 2 to buckle a counterpart 41 (see FIG. 4) thereof so as to have the belt body 2 extend over a user 9 (see FIG. 4). Further description is not vital to the illustration of the present invention and no further detail regarding thereto will be given hereinafter. However, it should be noted that the guide 5 has attached thereon a magnet holder 51 of an inverted U-shaped cross section, inside which a magnet 52 is fixed.

The protective pad 3, which has a generally flat first surface 31 and a concave second surface 32 (in FIGS. 1 to 5) constituted by a concave cross section thereof, is preferably made of a soft light-weight material, such as foam 30, with a slot formed on the flat surface 31 thereof, extending with the foam 30 of the pad 3. A hollow sliding guider 33 is received and fixed inside the slot. The sliding guider 33 has extensions 34 respectively partially wrapping the upper end and the lower end of the pad 3, and a slit 35 formed on the outer surface thereof to enable the installation of the pad 3 on the belt body 2. The size of the sliding guider 33 is such that the pad 3 is slidable along the belt body 2. The sliding guider 3, or at least a portion thereof, for example the extensions 34 thereof, is made of a ferromagnetic material or a material having ferromagnetic contents so that when the safety belt 1 of the present invention is not in use, it can be magnetically attached to the magnet 52 of the guide 5.

As shown in FIG. 5 and noted previously, the pad 3 has a concave cross section with the upper end and the lower end thereof slightly expanded so as to be more closely attached on the user's shoulder and more difficult to slip away from the user's shoulder.

To make the protective pad 3 durable, the foam 30 of which the pad 3 is made is preferably covered and enclosed by a synthetic leather 36 made of polyurethane (PU) so as to reduce the abrasion of the pad material resulting from contacting the user's skin or cloth, and this also gives the pad 3 a more beautiful look.

The second embodiment of the present invention is shown in FIG. 6. In this embodiment, the concave surface of the protective pad 3 is replaced with a wavy surface 37 so as to provide better ventilation to the user's skin. This is very practical in the summer time or in the tropics or subtropic. Similarly, the wavy pad 3 can also be enclosed with a synthetic leather 36.

The embodiments described above are for the purpose of illustration rather than limitation. It is understood that many modifications and variations of the present invention are possible in light of the above teachings. It is therefore to be understood that the invention may be practiced otherwise than as specially described herein and yet remain within the scope of the appended claims.

What is claimed is:

1. A safety belt with protective pad comprising a belt guide having a means for pivotally fixing the belt guide inside a vehicle, said belt guide having a magnet holder of an inverted U-shaped cross section fixed thereon to receive and fix therein a magnet;

a belt body which has a first end for fixing said belt body inside said vehicle and a second end passing through said guide and being capable of retracting into a storing bank formed inside said vehicle, said belt body further having a buckle member slidably mounted thereon to buckle a buckling counterpart thereof, a means for fixing said buckling counterpart inside said vehicle so as to have the belt body extend over a user's shoulder, chest and upper abdomen; and a protective pad which has a first surface and a second surface and an upper end and a lower end with a slot formed on said first surface, extending with said protective pad, said slot having a hollow sliding guider, which has a size large enough to allow said belt body to freely slide therein, received and fixed therein, said sliding guider having a slit formed thereon to allow the insertion of said belt body therein, said sliding guider having at least a portion thereof made of a ferromagnetic material so as to be magnetically attached to said magnet of the belt guide.

2. A safety belt with protective pad as claimed in claim 1, wherein said first surface of the protective pad is substantially flat and said second surface of the protective pad is concave with a larger cross-section formed on said upper and lower ends of the protective pad and a smaller cross section therebetween.

3. A safety belt with protective pad as claimed in claim 1, wherein said first surface of the protective pad is substantially flat and said second surface of the protective pad is wavy.

4. A safety belt with protective pad as claimed in claim 1 wherein said sliding guider has extensions respectively partially wrapping said upper and lower ends of the protective pad, and said extensions are made of a ferromagnetic material so as to have the pad magnetically attached to said magnet of the belt guide.

5. A safety belt with protective pad as claimed in claim 4, wherein said protective pad is made of a soft, light-weighted material.

6. A safety belt with protective pad as claimed in claim 5, wherein said soft, light-weighted material is foam.

7. A safety belt with protective pad as claimed in claim 2, wherein said protective pad is covered and enclosed by an enclosure.

8. A safety belt with protective pad as claimed in claim 7, wherein said enclosure is made of polyurethane.

9. A safety belt with protective pad as claimed in claim 3, wherein said protective pad is covered and enclosed by an enclosure.

10. A safety belt with protective pad as claimed in claim 9, wherein said enclosure is made of polyurethane.

* * * * *